Jan. 11, 1949.   G. VON KOSCIELSKI   2,458,811
FISH MEASURING TAPE
Filed Oct. 9, 1944
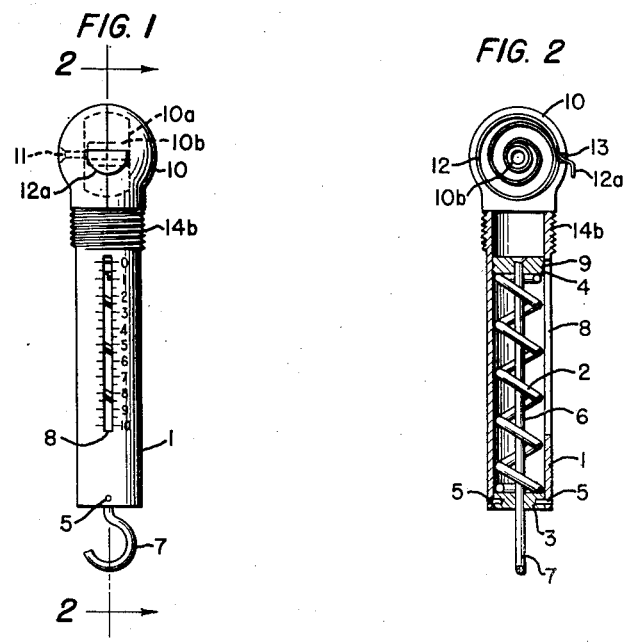
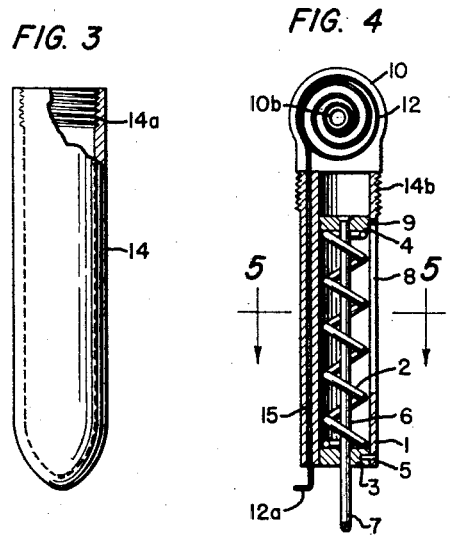
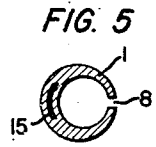
INVENTOR.
GEORGE VON KOSCIELSKI
BY
A. B. Bowman
ATTORNEY

Patented Jan. 11, 1949

2,458,811

UNITED STATES PATENT OFFICE 2,458,811

FISH MEASURING TAPE

George Von Koscielski, San Diego, Calif., assignor to Langley Corporation, a corporation Application October 9, 1944, Serial No. 557,863

2 Claims. (Cl. 33—138)

My invention relates to pocket scales and more particularly to a combination scale measuring the weight and length of small objects simultaneously when required, and the objects of my invention are:

First, to provide a pocket scale which can be made very small in size and weight yet retain accuracy and dependability in use;

Second, to design a scale which can be cheaply manufactured;

Third, to provide a scale which combines means for measuring length and weight of small objects simultaneously;

Fourth, to provide a pocket scale particularly adapted for use by fishermen in measuring the weight of a fish, its length and its diameter when desired; and Fifth, to provide a waterproof pocket scale for use of fishermen and others as disclosed in the modification included in this application.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is an elevational view of my pocket scale with the cover or cap removed and the measuring tape in retracted coiled position and shown in dash lines; Fig. 2 is a central sectional view of the scale taken from the line 2—2 in Fig. 1; Fig. 3 is an elevational view of the cartridge cap which is normally secured over the lower portion of my scale when not in use, a portion of the cap being broken away to show the internally threaded end of the cap; Fig. 4 is a central vertical sectional view of a modification of my invention with the cap removed and illustrating a construction of my invention with the measuring tape passing through the wall of the cylindrical portion, and Fig. 5 is a cross sectional view of the cylinder wall from the line 5—5 in Figure 4.

Similar characters of reference refer to similar parts and portions throughout the several views of the drawings.

The hollow cylinder 1 contains an accurately made helical spring 2 which is assembled between the plug 3 and the piston 4. The plug 3 is pinned to lower end of the cylinder by pins 5 as indicated in Figs. 2 and 4 and is centrally drilled to accommodate the rod 6 which terminates in the hook 7 and which is secured at its upper end to the piston 4. A slot 8 in the cylinder 1, longitudinally disposed, corresponds in length to the expected travel of the piston 4 when objects to be weighed are hung on said hook 7 and the cylinder is calibrated marginally of the slot 8 in pounds or ounces or otherwise as required. The base line of the piston or a suitable mark or ring 9 on its periphery will be opposite the zero mark of the calibration when the hook 7 is hanging free and as weight is added to the hook the readings may be made directly.

On the upper end of the cylinder 1 is a bulbous member 10 which may be made in two parts for ease in manufacture and assembly, the dividing line between the two parts corresponding with the section line 2—2 in Fig. 1, each half being drilled out at the center to provide a concavity indicated in Fig. 1 by the dash lines 10a. These two parts may be secured together by any suitable process and by the screwed pin 11 which is screwed into the axis pin 10b which supports a spring steel measuring tape reel 12 of more or less conventional design inserted during assembly. A slot 13, Fig. 2, in the side of the bulbous member 10 allows the lip end 12a of the tape to protrude so that the same may be grasped and the tape extended against its own spring tension when a linear measurement is to be made. This lip end 12a cannot enter the slot 13.

The cap 14 of cartridge type may actually be made from a cartridge when the object is intended to have a souvenir value and is internally threaded at the open end 14a to engage corresponding threads 14b on the cylinder 1 so that this cap can be secured over the hook end of my device when carried in the pocket or fishing kit.

In the modification illustrated in Figs. 4 and 5, the same general arrangement of parts is used except that the slot 13 in the bulbous member is dispensed with and a long slot or channel 15 is made in the wall of the cylinder 1 and this slot 15 extends into the bulbous member so that the end of the tape 12a is close to the hook 7 when both are retracted and the cap 14 when screwed onto the cylinder 1 covers both hook 7 and tape end 12a. In this modification both tape and weight scale can be used at one time, say for demonstration, instructional or pictorial uses and the device is also rendered waterproof. The slot 8 and all the other structural features of the modification are the same as hereinbefore described.

Though I have shown and described a particular construction, combination and arrangement of parts and portions, and a certain modification thereof, I do not wish to be limited to this particular construction, or to the modification, but desire to include in the scope of my invention the construction, combination and arrangement substantially as set forth in the appended claims.

Having thus described my invention, what I claim as new and desire to secure by Letters Patent is:

1. In a device for measuring fish, a casing, a coiled linear measuring tape in said casing and protruding therefrom, a fish supporting hook suspended from and below said casing adjacent said tape at the same end of said casing substantially parallel to the extension of said tape from said casing whereby said casing supports said fish and one end of said tape while said fish is being measured.

2. In a device for measuring fish, a casing, a coiled linear measuring tape in said casing and protruding therefrom a fish supporting hook suspended from and below said casing adjacent said tape at the same end of said casing substantially parallel to the extension of said tape from said casing whereby said casing supports said fish and one end of said tape while said fish is being measured, permitting one hand of a person to collectively hold a fish and one end of the measuring tape while the other hand of the person extends said measuring tape longitudinally of the fish being measured.

GEORGE VON KOSCIELSKI.

REFERENCES CITED

The following references are of record in the file of this patent:

UNITED STATES PATENTS

| Number | Name | Date |
|---|---|---|
| 861,952 | Clark | July 30, 1907 |
| 906,080 | Stewart | Dec. 8, 1908 |
| 992,648 | Fuchs | May 16, 1911 |
| 2,097,837 | Kaplan | Nov. 2, 1937 |
| 2,110,210 | Evans | Mar. 8, 1938 |

FOREIGN PATENTS

| Number | Country | Date |
|---|---|---|
| 4,009 | Great Britain | 1883 |
| 223,980 | Switzerland | Jan. 18, 1943 |